US006453009B2

(12) United States Patent
Berezowitz et al.

(10) Patent No.: US 6,453,009 B2
(45) **Date of Patent: *Sep. 17, 2002**

(54) X-RAY TUBE LIFE PREDICTION METHOD AND APPARATUS

(75) Inventors: William Allen Berezowitz, Greenfield; John Robert Breunissen, Wauwatosa; Diane Marie Miesbauer, Brookfield, all of WI (US)

(73) Assignee: GE Medical Technology Services, Inc., Pewaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,953

(22) Filed: Nov. 25, 1998

(51) Int. Cl.[7] ................................ G01B 31/24
(52) U.S. Cl. ................................ 378/118
(58) Field of Search ................................ 378/117, 118

(56) References Cited

U.S. PATENT DOCUMENTS 3,955,119 A * 5/1976 Perry et al. ................ 378/118
4,853,946 A * 8/1989 Elliott et al.
4,918,714 A * 4/1990 Adamski et al. ............ 378/117
5,434,900 A * 7/1995 Tanaka ........................ 378/4
5,530,735 A 6/1996 Gard et al. ................ 378/207
5,550,889 A 8/1996 Gard et al. ................ 378/113
5,625,662 A 4/1997 Toth et al. .................. 378/16
5,628,664 A 5/1997 Raber et al. ................ 445/70
5,673,301 A 9/1997 Tekriwal .................... 378/130

* cited by examiner

*Primary Examiner*—Craig E. Church
(74) *Attorney, Agent, or Firm*—Fletcher, Yoder & Van Someren

(57) ABSTRACT

Possible failure of x-ray tubes is predicted by monitoring and analysis of operating parameters considered leading indicators of failure. Historical data for a tube population is analyzed by discriminant analysis to develop a failure prediction algorithm. The algorithm is used to correlate operating parameters, or values derived from the operating parameters with a potential for tube failure. The operating parameters may include anode overcurrent events and spits, or spit rate exceeded errors for a diagnostic system in which the x-ray tube is installed.

24 Claims, 3 Drawing Sheets

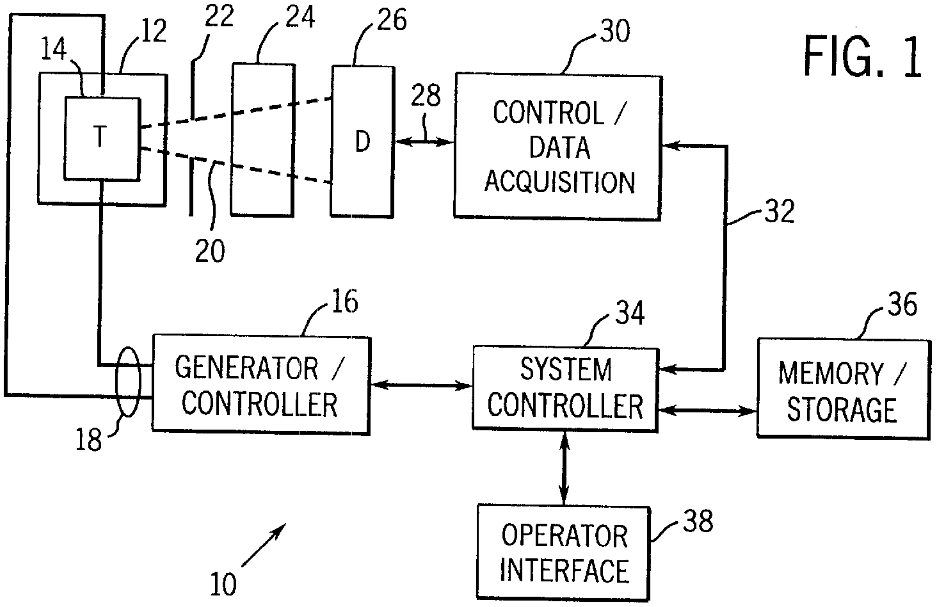
FIG. 1
FIG. 2
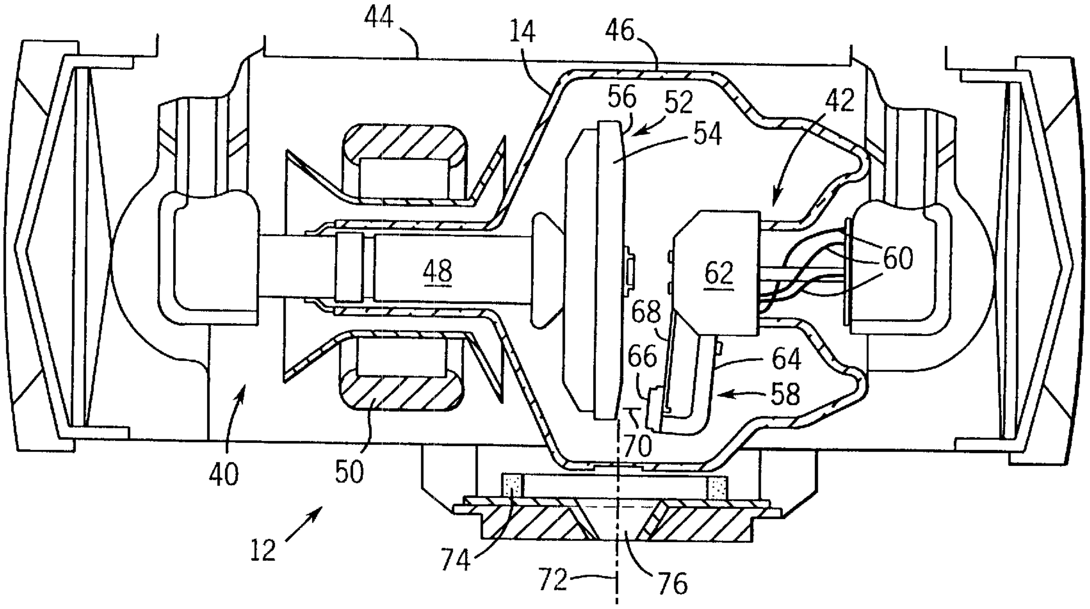

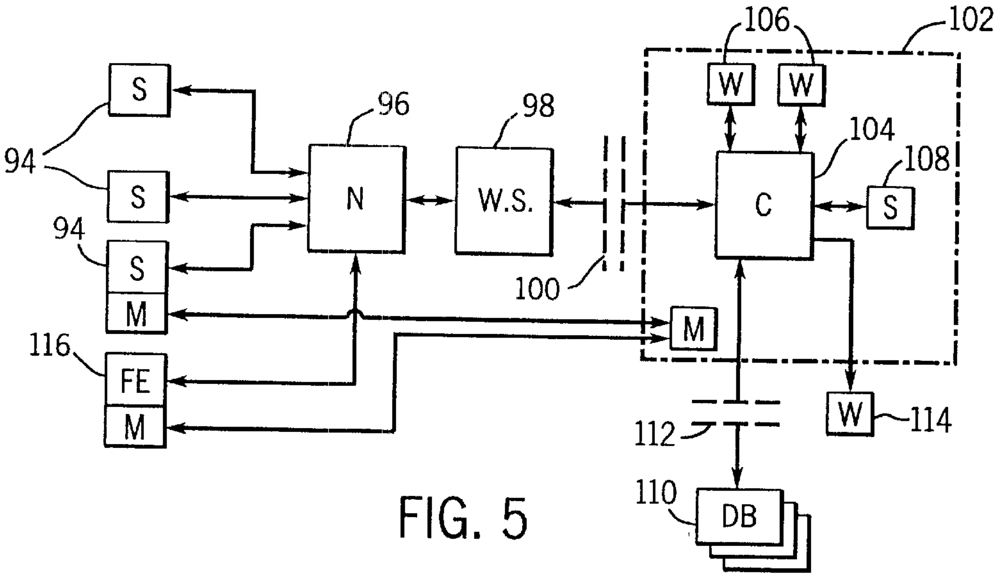
FIG. 5
FIG. 6
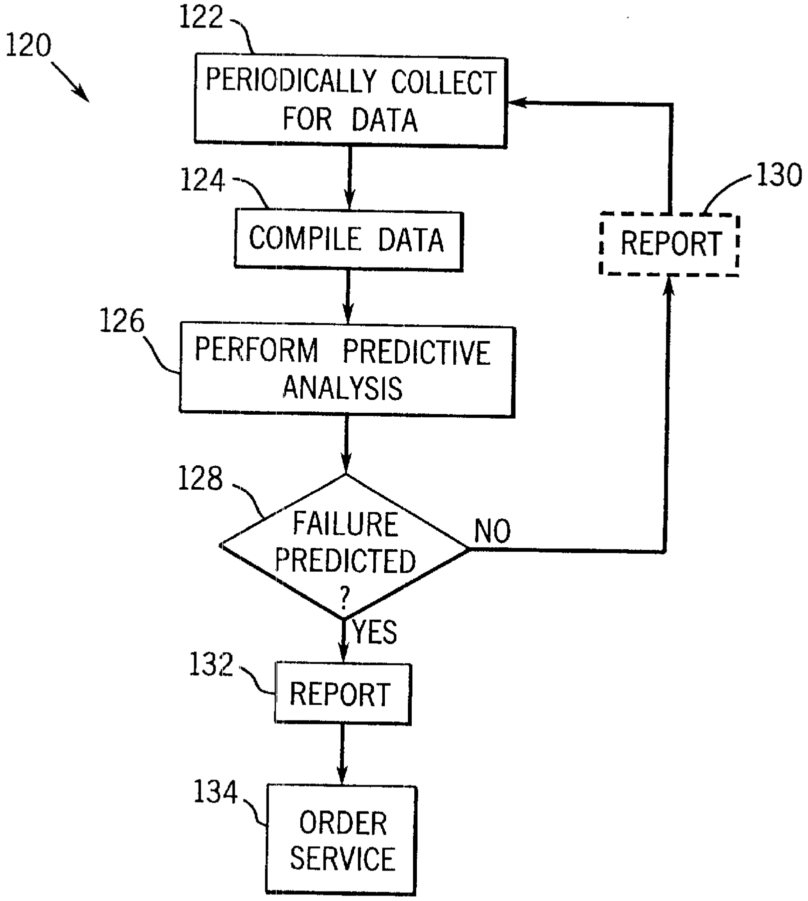

X-RAY TUBE LIFE PREDICTION METHOD AND APPARATUS

FIELD OF THE INVENTION

The present invention relates generally to the field of medical diagnostic systems employing x-ray tubes as sources of radiation. More particularly, the invention relates to a technique for predicting future life and possible failure of an x-ray tube through analysis of predictive parameters sensed during use of the tube.

BACKGROUND OF THE INVENTION

A variety of medical diagnostic and other systems are known in which x-ray tubes are employed as a source of radiation. In medical imaging systems, for example, x-ray tubes are used in both x-ray systems and computer tomography (CT) systems as a source of x-ray radiation. The radiation is emitted in response to control signals during examination or imaging sequences. The radiation traverses a subject of interest, such as a human patient, and a portion of the radiation impacts a detector or a photographic plate where the image data is collected. In conventional x-ray systems the photographic plate is then developed to produce an image which may be used by a radiologist or attending physician for diagnostic purposes. In digital x-ray systems a photo detector produces signals representative of the amount or intensity of radiation impacting discrete pixel regions of a detector surface. In CT systems a detector array, including a series of detector elements, produces similar signals through various positions as a gantry is displaced around a patient.

Depending upon the particular modality of the imaging system and the system configuration, the x-ray tube source may be mounted in various manners. For example, in conventional x-ray systems, anode and cathode assemblies support the x-ray tube within a casing. The anode assembly is coupled to a target within a glass or metal envelope, while the cathode assembly is coupled to a cathode plate. A metal shield or casing surrounds the glass envelope. The volume between the casing and the envelope is filled with a cooling medium, such as oil. A window is provided in the casing for emitting x-rays created by controlled discharges between the cathode plate and the target.

The x-ray tube is typically operated in cycles including periods in which x-rays are generated interleaved with periods in which the x-ray source is allowed to cool. A typical imaging sequence may include a number of such sequences. Moreover, the x-ray tube may have a useful life over a large number of examination sequences, and must generally be available for examination sequences upon demand in a medical care facility.

Given the demanding schedules to which x-ray tubes are often subjected, failure of the tubes is of particular concern. Various failure modes have been observed in x-ray tubes, and these may have a variety of sources. For example, within the glass encasement a vacuum or near vacuum is preferably maintained. However, due to leaks, degradation in the cathode or anode materials, decomposition of anode filaments, and so forth, particulates may be created or freed within the tube. These particulates may result in eventual failure of the tubes over time. Failure of the tubes can also be a function of the modes of operation and user-selected parameters, such as voltage or current.

Due to the stringent requirements and reliability demands placed on x-ray tubes in medical diagnostic systems, special programs may be implemented for insuring rapid replacement of the tubes upon failure. Present procedures for replacement of x-ray tubes in medical diagnostic systems are primarily reactionary. Service personnel generally monitor the performance of the tubes over time and through the various examination sequences. However, the service personnel are often made aware of tube failures only as they occur. When a tube does fail, to insure rapid replacement of failed tubes a conventional response is to expedite shipment of a replacement tube which is then installed by trained service personnel at considerable shipping and handling expense. While the x-ray tubes could be shipped in advance and stored on location or in a centralized service facility, these strategies also require inventory of relatively expensive items, again resulting in additional costs of the service program. Such inventories may also inconveniently occupy valuable storage space at the location.

There is a need, therefore, for an improved technique for predicting possible failure of x-ray tubes in medical diagnostic equipment. There is a particular need for a technique which will accurately predict potential failure, permitting replacement tubes to be shipped or replacement to be scheduled in an orderly fashion prior to the actual tube failure. Such a system could also provide feedback for planning the tube manufacturing and assembly process, as well as feedback to system users for planning the replacement process.

SUMMARY OF THE INVENTION

The present invention provides a technique for predicting possible failure of x-ray tubes designed to respond to these needs. The technique may be employed in conjunction with various types of systems employing x-ray tubes as radiation sources. The technique is particularly well suited to predicting failure of x-ray tubes in medical diagnostic equipment, such as conventional and digital x-ray systems, CT systems, and so forth. The technique allows data available from x-ray tube control and monitoring circuits to be analyzed as a leading indicator of future tube failure. In a presently preferred embodiment the parameters are monitored in data sweeps by a centralized service facility. Alternatively, the data may be monitored directly at the diagnostic equipment scanners and the analyses performed locally at the medical facility. Discriminant analysis is performed on certain candidate parameters considered to be leading indicators of tube failure. Based upon the results of the analysis an algorithm is developed for future analysis of operating parameters of the tubes. When a failure is predicted, a replacement tube may be ordered and shipped prior to the predicted failures. The facility in which the tube is installed may also be informed of the scheduled tube replacement, as may field service technicians who will install the replacement tube. The technique also facilitates reporting of the operability of the systems incorporating the tubes to the facility.

Thus, in accordance with one aspect of the invention, a method is provided for predicting failure of an x-ray tube. For such failure prediction, a plurality of operating parameters of the x-ray tube are monitored, and a failure prediction value is derived from the monitored parameters. The failure prediction value is compared to a desired reference value. Based upon the comparison a signal indicative of predicted tube failure is generated. The desired reference value may also be derived from the monitored parameters. Moreover, the parameters may be monitored, the comparison made, and the failure prediction signal generated either at a tube location, or at a remote location, such as at a service center. In a presently preferred embodiment, the parameters monitored in the process include parameters related to anode overcurrent events and to spits occurring within the x-ray tube. The failure prediction value may be derived from the monitored parameters in accordance with an algorithm established by statistical methods, such as discriminant analysis.

The invention also relates to a method for predicting potential failure of x-ray tubes which includes steps of monitoring operating parameters of a population of x-ray tubes, and performing statistical analysis of the monitored parameters. A failure prediction algorithm is then generated from the statistical analysis. The statistical analysis may include discriminant analysis of a range of monitored parameters. The method may include further steps of monitoring operating parameters of at least one x-ray tube and predicting failure of the x-ray tube based upon the monitored parameters and the failure prediction algorithm.

The invention also provides a system for predicting failure of an x-ray tube. The system includes a monitoring circuit coupled to the x-ray tube for monitoring operating parameters indicative of possible failure. The system also includes a failure prediction circuit coupled to the monitoring circuit. The failure prediction circuit executes a failure prediction routine based upon the monitored parameters and generates a failure prediction signal based upon the routine. The failure prediction circuit and the monitoring circuit may be provided at the same or at different locations. In a preferred configuration, the failure prediction circuit is positioned remote from the monitoring circuit, and receives data representative of the monitored parameters via a network connection.

BRIEF DESCRIPTION OF THE DRAWINGS

FIG. 1 is a diagrammatical representation of a digital x-ray imaging system incorporating an x-ray tube as a source of radiation;

FIG. 2 is a diagram of an exemplary x-ray tube of the type incorporated in the system of FIG. 1;

FIG. 5 is a diagrammatical representation of a service network linked to a series of scanners of the type illustrated in FIG. 1 for monitoring tube performance, predicting possible tube failure, and scheduling replacement of x-ray tubes; and, FIG. 6 is a flow diagram illustrating steps in exemplary logic for monitoring and predicting failure of x-ray tubes and for scheduling their replacement.

DETAILED DESCRIPTION OF THE INVENTION

Figure 3:
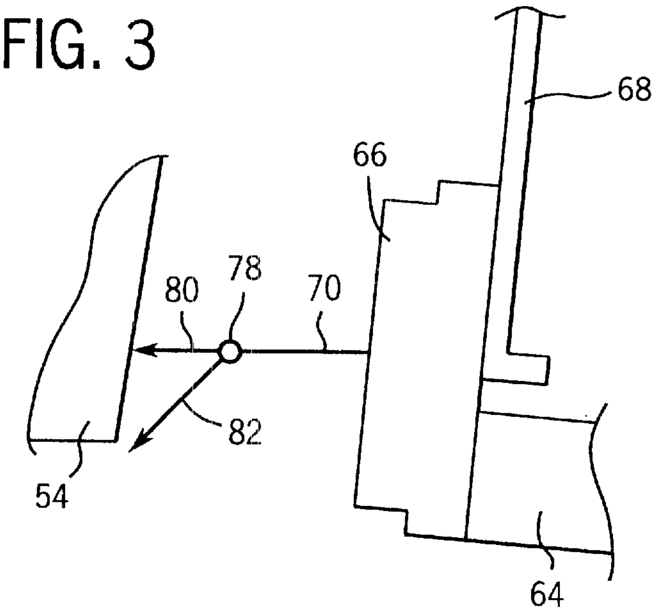
FIG. 3 is a detail view of a portion of the operative components of the x-ray tube of FIG. 2 illustrating events which give rise to parameters presently considered as leading indicators of possible tube failure.

Turning now to the drawings, and referring first to FIG. 1, a diagnostic imaging system 10 is illustrated diagrammatically. System 10 includes a source of x-ray radiation 12 which employs an x-ray tube 14. In the embodiment illustrated in FIG. 1, system 10 is a digital x-ray imaging system. However, it should be noted that the digital x-ray system is illustrated and described herein as an exemplary system only. The present technique for predicting tube failure and scheduling tube replacement may be applied to any type of imaging, diagnostic, or other system employing such x-ray tubes, such as conventional x-ray systems, CT systems, and so forth.

In the system shown in FIG. 1, radiation source 12 receives power and control signals from a generator or controller 16. Generator 16 converts alternating current power to direct current power and applies controlled pulses of DC power to tube 14 to induce emissions of x-ray radiation for examination purposes. Moreover, generator 16 monitors a range of operating conditions or parameters of the tube in a manner described in greater detail below. Power and control signals from generator 16 are conveyed to tube 14 via a set of conductors 18.

Under the command of generator 16, tube 14 within the radiation source produces a stream of radiation 20. The radiation is directed through a collimator 22 and passes through a subject 24, such as a human patient, during examinations. A portion of the radiation impacts a detector 26. In the case of a digital x-ray system, detector 26 converts high energy photons to lower energy photons which are detected by a series of photo diodes (not shown). The detector electronics convert the sensed signals to image data which is output as indicated at reference numeral 28. Detector 26 conveys the image data signals to a control/data acquisition circuit 30. Circuit 30 also provides control signals for regulating scanning of the detector. Moreover, circuit 30 may perform additional signal processing or signal filtering functions. Following such processing, circuit 30 conveys the processed image data, indicated at reference numeral 32, to a system controller 34.

System controller 34 receives the image data and performs further processing and filtration functions. In particular, controller 34 derives discrete data from the acquired signals and reconstructs useful images from the data. Controller 34 then stores the image data in a memory or storage device 36. Device 36 may also be used to store configuration parameters, data log files, and so forth. In a presently preferred configuration, system controller 34 also provides signals to generator 16 for controlling emissions of x-ray radiation from source 12. System controller 34 may also include circuitry for providing interactive data exchange with remote computer stations, such as a centralized service center as described more fully below. Finally, system controller 34 includes interface circuitry for exchanging configuration data, examination requests, and so forth, with an operator interface 38. The system may also include sensors for detecting specific operating parameters, such as temperature and vibration, values of which may also be stored and analyzed as described below. Operator interface 38 preferably includes an operator work station which permits clinicians or radiologists to request and control specific examinations, review data log files, view reconstructed images, and output reconstructed images on a tangible medium, such as photographic film.

As will be appreciated by those skilled in the art, the foregoing system description is specific to digital x-ray imaging. Other control and interface circuitry will, of course, be included on other scanner types, such as conventional x-ray systems, CT imaging systems, and so forth. In general, however, such systems will include a generator or controller for commanding emission of x-ray radiation for examination or calibration purposes. Moreover, for implementation of the present technique, such systems will include inherent capabilities for monitoring performance of the x-ray tube during such examination or calibration sequences such that parameters considered as leading indicators of tube failure may be acquired, stored and analyzed.

FIG. 2 illustrates an exemplary radiation source 12, including an x-ray tube 14. In the embodiment shown in FIG. 2, the radiation source includes an anode assembly 40 and a cathode assembly 42. The anode and cathode assemblies, along with x-ray tube 14 are positioned within a casing 44 which may be made of aluminum and lined with lead. Tube 14 is supported by the anode and cathode assemblies within the casing. Tube 14 includes a glass envelope 46. Within the glass envelope, adjacent to anode assembly 40, a rotor 48 is positioned. A stator 50 at least partially surrounds the rotor for causing rotation of an anode disc during operation, as described below. Casing 44 is filled with a cooling medium such as oil around glass envelope 46. The cooling medium also preferably provides high voltage insulation.

Within envelope 46, tube 14 includes an anode 52, a front portion of which is formed as a target disc 54. A target or focal surface 56 is formed on disc 54 and is struck by an electron beam during operation as described below. Tube 14 further includes a cathode 58 which is coupled to the cathode assembly 42 via a series of electrical leads 60. The cathode includes a central shell 62 from which a mask 64 extends. The mask encloses leads 60 and conducts the leads to a cathode cup 66 mounted at the end of a support arm 68. Cathode cup 66 serves as an electrostatic lens that focuses electrons emitted from a heated filament (not shown) supported by the cup.

As will be appreciated by those skilled in the art, as control signals are conveyed to cathode 58 via leads 60, the cathode filaments within cup 66 are heated and produce an electron beam 70. The beam strikes the focal surface 56 and generates x-ray radiation which is diverted from the x-ray tube as indicated at reference numeral 72. The direction and orientation of beam 72 may be controlled by a magnetic field produced by a deflection coil 74. The field produced by deflection coil 74 is also preferably controlled by the generator and controller circuitry 16 described above. Radiation beam 72 then exits the source through an aperture 76 in casing 44 provided for this purpose.

X-rays are produced in the x-ray tube 14 when, in a vacuum, electrons are released and accelerated by the application of high voltages and currents to the cathode assembly and are abruptly intercepted by the anode target disc. The voltage difference between the cathode and anode components may range from tens of thousands of volts to in excess of hundreds of thousands of volts. Moreover, the anode target disc may be rotated such that electron beams are constantly striking a different point on the anode perimeter. Depending upon the construction of tube 14, the desired radiation may be emitted by substances such as radium and artificial radiotropics, as well as electrons, neutrons and other high speed particles. Within the envelope of tube 14, a vacuum on the order of $10^{-5}$ to about $10^{-9}$ torr at room temperature is preferably maintained to permit unperturbed transmission of the electron beam between the anode and cathode elements.

As noted above, in addition to providing power and control signals for operation of tube 14, generator 16 (see FIG. 1) monitors operating parameters of the tube. Certain of these parameters are considered as predictive of future tube failure in accordance with the present technique. Such parameters may be measured via sensors, but are preferably available from the characteristics of the control and power signals applied to the tube. FIG. 3 is a detailed representation of a portion of the tube components, and illustrates certain operational anomalies which can occur in the tube leading to detectable parameters considered to be predictive of future tube failure.

As shown in FIG. 3, cathode cup 66 is positioned adjacent to anode disk 54 within the interior of the x-ray tube. As power is applied to filaments within the cathode cup, an electron beam 70 is emitted which strikes the anode disk. While the beam is preferably created in a vacuum, during operation of the x-ray tube particulates 78 may be present in the tube. Such particulates may be introduced in the tube by leaks, degradation of the system components within the tube, decomposition of the tube filaments, and so forth. When electron beam 70 impacts such particulate matter, the electron beam may continue toward the anode disk as indicated by reference numeral 80. In certain cases, however, the electron beam may be deflected from the target disk as indicated at reference numeral 82. Both incidents create anomalies in the signals exchanged between the tube and the generator 16 which can be detected by the generator. In general, such events create high current discharges. When particulate is encountered by the electron beam and the beam continues along its path to impact the anode disk, an anode overcurrent event may be recorded. Moreover, where the electron beam is diverted from the anode disk by the particulate, the high current discharge event is generally termed a "spit" in the art. In addition to detecting current anomalies of these types, generator 16 is capable of distinguishing between anode overcurrent events and spits. Such events are recorded by system controller 34 and saved within memory circuitry 36. As will be appreciated by those skilled in the art, various other anomalies may be detected and recorded in a similar manner.

In addition to recording the actual number of anode overcurrent events and spits, system controller 34 preferably derives additional parameters from at least one of these. In the present embodiment, for example, the system controller records the number of spits per day of operation. Moreover, the current to the x-ray tube may be interrupted upon the occurrence of a spit, and subsequently reapplied during an examination sequence. Such events are recorded by the system controller and logged for each day of operation. However, a maximum "spit rate" may be imposed in terms of spits per unit time. If the spit rate is greater than a preset limit, a scan or examination is typically aborted. For example, in a present embodiment of the system, a spit rate of over 32 spits/second causes the current examination scan to be aborted. Such events are termed "spit rate exceeded" errors or "SREs." The number of SREs per day is also monitored by system controller 34 and stored in memory circuitry 36.

Through extensive analysis of operating parameters for a population of x-ray tubes, it has been found that certain of the parameters monitored by generator 16 and system controller 34 provide accurate predictive indicators of tube failure. From this analysis a model algorithm has been developed which permits the monitored parameters to be correlated with a potential for tube failure. While algorithms including a large number of monitor parameters may be included in such failure prediction analyses, in a present embodiment the rate of occurrence of anode overcurrent events and SREs are used to generate failure prediction values which may be compared to evaluate the potential for short term tube failure. As described more fully below, discriminant analysis is used in the present technique to identify and to properly weight such predictive parameters in the algorithm, and to relate them in a value considered predictive of tube failure.

Figure 4:
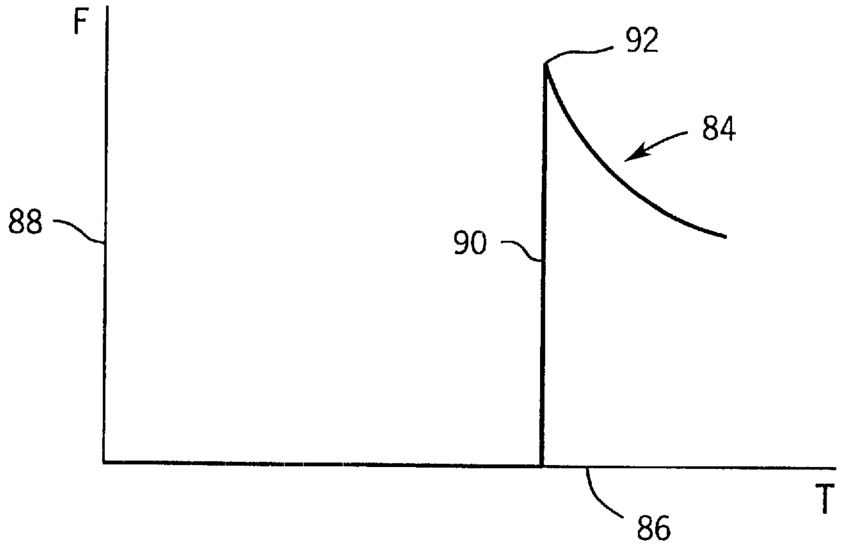
FIG. 4 is a graphical representation of an exemplary time histogram of events presently considered indicative of future tube failure.

By way of example, FIG. 4 is a graphical representation of a "Z0-score" derived from data files of SREs for an exemplary x-ray tube. The Z-score is calculated based upon the occurrences of SREs by the following relationship:

$$Z-score = \frac{SRE_{3d} - SRE_L}{\sigma_{SRE}}; \quad \text{(eq. 1)}$$

Where $SRE_{3d}$ is the average number of SREs per day over a previous three day period, $SRE_L$ is the average number of SREs per day over the life of the tube, and $\sigma_{SRE}$ is the standard deviation of the number of daily SREs over the life of the tube.

FIG. 4 represents a histogram or curve 84 of the Z-score over time. The Z-score may be graphed over a base line of time 86 and a magnitude on a vertical axis 88. As indicated by the histogram, the Z-score is generally expected to remain at an extremely low or null level throughout most of the useful life of the x-ray tube. At some time during the life of the tube, however, a sharp rise will be detected in the Z-score, such as due to an increase in particular matter within the tube resulting in an increase in SREs, as indicated by the sharp rise 90 in the histogram. In many systems the rise will be followed by a peak 92 and a subsequent drop off. It is believed that such a drop off may occur due to a tendency for a particular matter to drop to the bottom of the tube.

As indicated above, in accordance with the present technique, discriminant analysis is used to determine weighting coefficients for the parameters considered to be predictive of failure. In the presently preferred technique, two weighted functions are obtained through the discriminant analysis as follows:

$$Idf1 = C_1 + K_1\,(\text{adjrate}) + K_2(aoc) \quad \text{(eq. 2)};$$

and, $$Idf2 = C_2 + K_3\,(\text{adjrate}) + K_4(aoc) \quad \text{(eq. 3)};$$

where the value Idf1 is a first linear discriminant function value, Idf2 is a second linear discriminant function value, $C_1$ and $C_2$ are constants resulting from the discriminant analysis, $K_1$, $K_2$, $K_3$ and $K_4$ are coefficients resulting from the discriminant analysis, adjrate is the Z-score for the tube, and the value aoc is the count of daily anode overcurrent events. In the present embodiment, the values for the constants and coefficients applied in equations 2 and 3 are as follows:

| | |
|---|---|
| $C_1$ | −0.12588 |
| $C_2$ | −0.00937 |
| $K_1$ | 0.83695 |
| $K_2$ | 0.19511 |
| $K_3$ | 0.1833 |
| $K_4$ | 0.19962. |

In the present embodiment, if the value of Idf2 is found to be greater than or equal to the value of Idf1 no imminent failure is predicted for the tube. On the contrary, when the value of Idf1 exceeds the value of Idf2, the tube is considered to be near failure, and its replacement is scheduled as summarized below.

It should be noted that the foregoing values and correlations have been determined through extensive analysis of a variety of parameters and their fluctuations over the life of a population of x-ray tubes. In accordance with the present technique, the statistical analyses may be employed to identify the particular parameters discussed above, or additional or different parameters which may be considered indicative of impending tube failure. Similarly, the particular constant and weighting values indicated above may be altered or replaced by other values to accurately predict potential tube failure.

As noted above, in the present embodiment the parameters considered indicative of future tube failure are monitored at the individual diagnostic or imaging system in which the tube is installed. The analysis of these parameters may also be performed at the diagnostic system, or may be performed remotely, such as at a central service facility. FIG. 5 represents a diagrammatical representation of a number of diagnostic systems or scanners 94 coupled to such a central service facility via a remote data exchange network. In the embodiment illustrated in FIG. 5 scanners 94, which may be similar to or different from one another, include interactive communications hardware and software for communicating over a network represented generally at reference numeral 96. Network 96 may include an intranet, internet or other network, such as the Internet. In such cases, the scanners are preferably provided with network software, such as a graphical user interface and browser permitting operations personnel at a facility to send and receive messages with the central service facility. The network 96 permits the scanners to be coupled to a web server 98 which manages communications and data traffic between the central service facility and the scanners on the network. Alternatively, the scanners may be designed to be linked directly to the service facility by a modem-to-modem connection, as indicated by the letter M in FIG. 5.

The server 98 may transmit and receive data with the scanners, and with a central service facility 102 through a firewall 100, particularly with a Point-to-Point Protocol (PPP). Firewall 100 may include any of various known security devices for preventing access to central service facility 102 except by recognized subscribers and other users. Central service facility 102 includes one or more central computers 104 which coordinates data exchange between the network scanners and work stations 106 at the central service facility. Work stations 106 may, in turn, be staffed by service personnel. Computer 104 may also be coupled for data exchange with one or more servers 108 at the central service facility. Moreover, computer 104 or other devices at the central service facility may be coupled or configured to be coupled to other internal or external networks, such as for exchanging data with databanks 110 through an additional firewall 112. In the presently preferred configuration, databanks 110 may be local to or remote from the central service facility, and may contain data relating to history on particular scanners, families of scanners, populations of tubes, and the like. Such data is compiled over time by transmission from computer 104, and is subsequently accessible by computer 104 to establish or revise the particular algorithms employed for predicting future failure of the tubes. Finally, the central service facility may be coupled to a warehouse 114 or similar facility for ordering shipment of replacement tubes depending upon the outcome of the analysis summarized above.

It should be noted that in the presently preferred embodiment, the technique for predicting possible failure of x-ray tubes, and scheduling their replacement, may incorporate planning for production, transportation, warehousing, and similar processes. Accordingly, as illustrated in FIG. 5, the block 114 should be understood to include manufacturing and assembly operations, storage facilities, transportation infrastructure, and the like. Thus, based upon predicted failure of a particular type or types of tubes, the system may schedule manufacturing or assembly operations, cause parts or sub-components to be ordered or assembled, and the like.

Similarly, tubes for which failure is predicted or possible may be transported or assigned to specific storage locations or forward staging areas at or near the locations where the tubes will be needed. In a presently preferred configuration, the system may sweep tube parameters from a variety of scanners, associate possible tube failures with a list of subscriptions stored in a database 110, and command manufacturing, transportation, storage and other upstream replacement processes, as well as the actual tube replacement itself.

In operation, the central service facility 102 can access scanners 94 at will via the various network connections. Periodic sweeps of the scanners may be implemented in which the data necessary for evaluation of possible future tube failure is acquired with or without intervention from service or operations personnel at the institutions in which the scanners are installed. Moreover, similar network transfer of the data may originate at the individual scanners. Once the information has been obtained by the service facility, the computations and comparisons required for prediction of possible tube failure are made as described above. If the prediction is found to be positive, replacement of the tube is scheduled.

The foregoing structure also permits various alternative management procedures to be implemented. For example, the data acquisition and comparisons may be made directly at the individual scanners. In such cases, the algorithm may be stored a priori at the scanners, or may be downloaded from the service facility to the scanners. When the scanner determines that a tube failure is possible or imminent, a message can be sent from the individual scanner to the central service facility, which then schedules for tube replacement. Similarly, when multiple scanners or diagnostic systems are provided in an institution, a central management station may be linked to the scanners in an internal network. The central management station may then collect the monitored parameter data and perform the failure prediction, or may transmit the information to a service facility for analysis.

It is also contemplated that the central service facility may conduct the evaluations described herein and schedule tube replacement only for scanners for which a conforming service contract or agreement has been completed. Accordingly, in appropriate situations, the central service facility may only sweep data from service subscribing scanners, or may transmit updated failure analysis algorithms to such subscribing scanners.

It should also be noted that the present technique permits a remote field engineer station to be integrated into the tube replacement process, as shown at reference numeral 116 in FIG. 5. As will be appreciated by those skilled in the art, field service engineers may access information on replacement of tubes through the same network used to link the scanners to the service facility. When replacement of a tube is scheduled, therefore, the field engineer may be notified of the need to attend to such replacement.

The foregoing procedure is summarized in FIG. 6. As shown at step 122 in FIG. 6, subscribing scanners or facilities are periodically swept to obtain data on parameters considered indicative of possible x-ray tube failure, such as anode overcurrent events, and SREs rates or Z-scores derived from the SRE data. Alternatively, the data collection may be performed locally at the diagnostic system. All or a portion of the analysis may also be performed at the diagnostic system, which may then flag possible failure to the service facility. At step 124, the data is compiled, either at the central service facility or at the scanners (or internal management station), to obtain the failure prediction values needed for the prediction analysis. At step 126 the predictive analysis is performed, such as through the calculations summarized above in equations 2 and 3. The predictive failure analysis concludes at step 128 wherein a comparison is made between the failure prediction values, as summarized above. Where the result of the comparison indicates that failure is not imminent, this fact may be reported to the scanner or institution in which the scanner is installed, as indicated at step 130. The periodic sweeping and analysis summarized above then is repeated over the course of the tube life.

If the result of the comparison made at step 128 is affirmative, this fact is reported to the scanner or institution at step 132. In addition, a service order is generated at step 134 and a replacement tube is ordered from a warehouse or factory as indicated at reference numeral 114 in FIG. 5. Moreover, the service order includes an electronic message notification sent to a field service engineer, such as via a remote station 116, to inform the field service engineer that replacement of the tube is required. Alternatively, the field service engineer may place a service order in response to receipt of a failure prediction or replacement scheduling message.

As noted above, the method may include coordination of other upstream operations in addition to the actual scheduling of the tube replacement. Thus, parts or subcomponents may be ordered, manufactured, or assembled based upon the predicted failure. Moreover, where local warehousing or staging areas are provided, tubes may be shipped in advance to such locations in anticipation for the predicted failure. Also, messages provided via the present technique, both to field service engineers, as well as to scanner operations personnel, may include an indication of remedial or other measures which can be implemented to avoid or forestall the predicted tube failure pending its replacement.

The foregoing technique thus permits effective prediction of possible tube failure by algorithms derived from actual occurrences of historic tube failures. The algorithms may be refined and altered over time as desired. Moreover, alternative algorithms may be developed for particular families or types of tubes, or for particular types of diagnostic equipment. Upon implementation, the technique facilitates planned replacement of the tubes with little or no intervention from operations personnel. At the same time, the technique allows the institutions to be kept abreast of the operational state of the x-ray tubes, and of scheduled or needed replacement as these are identified by the central service facility. Additional costs of stocking and transporting replacement of tubes after failure may thereby be reduced or eliminated, as may costs and inconvenience associated with downtime of diagnostic equipment.

What is claimed is:

1. A method for predicting failure of an x-ray tube, the method comprising the steps of:

monitoring a plurality of operating parameters of the x-ray tube by transmitting signals representative of the parameters over a computer network, the plurality of operating parameters indicative at least of the presence of particulate matter in the tube;

deriving a failure prediction value from a combination of the plurality of monitored parameters;

comparing the failure prediction value to a desired reference value, wherein the desired reference value is derived from the combination of the plurality of parameters based upon analysis of potential failure related parameters for a population of a plurality of x-ray tubes; and generating a signal indicative of predicted tube failure based upon the comparison.

2. The method of claim 1, wherein the desired reference value is derived from monitored operating parameters of the x-ray tube.

3. The method of claim 1, wherein x-ray tube is included in a medical diagnostic system, and the plurality of parameters are monitored from a monitoring system remote from the system.

4. The method of claim 1, wherein the failure prediction parameter is derived from the combination of plurality of parameters based upon discriminant analysis of potential failure-related parameters for a population of x-ray tubes.

5. The method of claim 3, wherein the plurality of parameters are monitored by periodic data sweeps between a remote monitoring system and the system.

6. The method of claim 5, wherein the data sweeps are initiated by the remote monitoring system.

7. The method of claim 1, wherein the plurality of parameters includes a parameter indicative of anode overcurrent events for the x-ray tube.

8. The method of claim 7, wherein the plurality of parameters includes a parameter derived from spit events for the x-ray tube.

9. The method of claim 8, wherein the parameter derived from spit events is based upon a z-score for the x-ray tube.

10. A method for predicting potential falure of an x-ray tube in a medical diagnostic system, the method comprising the steps of:

monitoring a combination of parameters indicative of the presence in the x-ray tube of particulate matter;

deriving a predictive value from the combination of parameters;

comparing the predictive value to a desired reference value, wherein the desired reference value is derived from the combination of parameters based upon analysis of potential failure related parameters for a population of a plurality of x-ray tubes; and generating a signal indicative of potential failure of the x-ray tube based on the predictive value.

11. The method of claim 10, wherein the parameters are monitored from a location remote from the diagnostic system.

12. The method of claim 10, wherein the parameters include a first parameter based upon occurrence of anode overcurrent events and a second parameter based upon occurrence of spit events.

13. The method of claim 12, wherein the second parameter is based upon occurrence of spit rate exceeded errors in the system.

14. A method for predicting potential failure of x-ray tubes, the method comprising the steps of:

monitoring operating parameters for a population of x-ray tubes by transmitting signals representative of the parameters over a computer network, the operating parameters indicative at least of the presence of particulate matter within one or more of the x-ray tubes;

performing statistical analysis of a combination of the monitored parameters;

deriving a reference value based on the combination of parameters based upon analysis of potential failure related parameters for a population of a plurality of x-ray tubes; and generating a failure prediction algorithm based upon the statistical analysis.

15. The method of claim 14, wherein the monitored parameters include a first value based upon occurrence of anode overcurrent events and a second value based upon occurrence of spits.

16. The method of claim 14, wherein the failure prediction algorithm is generated by discriminant analysis of the monitored parameters.

17. The method of claim 14, comprising the further steps of:

monitoring operating parameters of at least one x-ray tube; and predicting failure of the at least one x-ray tube based upon the monitored parameters and the failure prediction algorithm.

18. The method of claim 15, wherein the second value is based upon occurrence of spit rate exceeded errors for the at least one x-ray tube.

19. A system for predicting possible failure of an x-ray tube, the system comprising:

a monitoring circuit coupled externally to the x-ray tube, the monitoring circuit monitoring operating parameters of the x-ray tube indicative of possible failure, the operating parameters indicative at least of the presence of particulate matter in the tube; and a failure prediction circuit coupled to the monitoring circuit, the failure prediction circuit executing a failure prediction routine based upon a combination of the monitored operating parameters and generating a failure prediction signal based upon the routine, the roution comprises deriving a reference value derived from the combination of the monitored operating parameters based upon analysis of potential failure-related parameters for a population of a plurality of x-ray tubes.

20. The system of claim 19, wherein the x-ray tube is included in a medical diagnostic system and the failure prediction circuit is remote from the medical diagnostic system.

21. The system of claim 20, wherein the failure prediction circuit is included in a remote service facility.

22. The system of claim 21, wherein the remote service facility is configured for monitoring the operating parameters via a network connection to the diagnostic system.

23. The system of claim 22, wherein the remote service facility is configured to collect signals representative of the monitored operating parameters via periodic data sweeps of the medical diagnostic system.

24. The system of claim 19, wherein the x-ray tube is included in a medical diagnostic system and the monitoring circuit is local to the diagnostic system.

* * * * *